United States Patent
Noji et al.

(10) Patent No.: US 7,053,382 B2
(45) Date of Patent: May 30, 2006

(54) X-RAY IMAGE TUBE, X-RAY IMAGE TUBE DEVICE AND X-RAY DEVICE

(75) Inventors: Takashi Noji, Nasu-gun (JP); Koichi Nittoh, Yokohama (JP); Chikara Konagai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 84 days.

(21) Appl. No.: 10/795,414

(22) Filed: Mar. 9, 2004

(65) Prior Publication Data
US 2004/0208281 A1    Oct. 21, 2004

Related U.S. Application Data

(63) Continuation of application No. PCT/JP03/03998, filed on Mar. 28, 2003.

(30) Foreign Application Priority Data
Mar. 28, 2002    (JP) .............................. 2002-092339

(51) Int. Cl.
*H01J 31/50*    (2006.01)
*G01T 1/16*    (2006.01)

(52) U.S. Cl. .......................... 250/370.11; 250/314 VT; 378/98.2; 378/98.9

(58) Field of Classification Search ........... 250/370.11, 250/213, 214 VT; 378/98.2, 98.3, 98.8
See application file for complete search history.

(56) References Cited

U.S. PATENT DOCUMENTS

| | | | |
|---|---|---|---|
| 3,617,743 A | * | 11/1971 | Rabatin et al. ....... 250/214 VT |
| 3,829,700 A | * | 8/1974 | Buchanan et al. ........ 250/483.1 |
| 4,431,922 A | * | 2/1984 | Patten ...................... 250/486.1 |
| 4,647,811 A | | 3/1987 | Galves et al. |
| 4,952,794 A | * | 8/1990 | Kemner et al. ........ 250/214 VT |
| 5,631,459 A | | 5/1997 | de Groot |
| 5,974,113 A | * | 10/1999 | Bruijns et al. ............. 378/98.7 |
| 6,226,351 B1 | * | 5/2001 | Snoeren et al. .......... 378/98.12 |
| 6,392,248 B1 | | 5/2002 | Takahara et al. |
| 6,559,449 B1 | * | 5/2003 | Ikeda et al. ............. 250/361 R |

FOREIGN PATENT DOCUMENTS

| | | |
|---|---|---|
| JP | 48-6157 | 2/1973 |
| JP | 48-12676 | 4/1973 |
| JP | 57-174842 | 10/1982 |
| JP | 8-203573 | 4/1996 |
| JP | 2001-209142 | 8/2001 |

* cited by examiner

*Primary Examiner*—Albert Gagliardi
(74) *Attorney, Agent, or Firm*—Pillsbury Winthrop Shaw Pittman, LLP (57) ABSTRACT

An object of the present invention is to provide an X-ray image tube which enables acquisition of an image of a proper density by increasing contrast without increasing an irradiation dose of X-rays. The X-rays absorbed or scattered through a subject emit light on an input surface formed in an input window, and the light is further converted into electrons on a photoelectric surface which converts the light into the electrons, accelerated and focused by a focusing electrode, and then guided to an anode side. The electrons guided to the anode side are made visible by a fluorescent substance, and an image of a color is projected on a glass plate with a luminance and a color based on a distribution of the incident X-rays in accordance with the dose of the X-rays.

21 Claims, 7 Drawing Sheets

X-RAY IMAGE TUBE, X-RAY IMAGE TUBE DEVICE AND X-RAY DEVICE

CROSS-REFERENCE TO RELATED APPLICATIONS

This is a Continuation Application of PCT Application No. PCT/JP03/03998, filed Mar. 28, 2003, which was not published under PCT Article 21(2) in English.

This application is based upon and claims the benefit of priority from prior Japanese Patent Application No. 2002-092339, filed Mar. 28, 2002, the entire contents of which are incorporated herein by reference.

BACKGROUND OF THE INVENTION

1. Field of the Invention

The present invention relates to an X-ray image tube, an X-ray image tube device and an X-ray device for displaying colors.

2. Description of the Related Art

Generally, in X-ray photography for use in medical diagnosis, industrial nondestructive inspection or the like, in order to improve sensitivity of a photographic system, an image is projected on the X-ray image tube, and the thus projected image is picked up by a monochrome CCD camera to pick up the X-rays. That is, in the X-ray photography, the X-rays passed through a subject is converted into visible light on an input fluorescent screen of an input side disposed in the X-ray image tube. This light is converted into electrons on a photoelectric surface disposed together with the input fluorescent screen. These electrons are then electrically amplified, and converted into visible light by a fluorescent substance of an output side to form an image. The thus-formed visible image is picked up by the CCD camera to form a visualized image of the subject.

In such X-ray photography, in order to improve visibility, a high-contrast image pickup state is widely utilized in which a gradient of a characteristic curve of the monochrome CCD is enlarged. For example, in the case of breast photography, it is necessary to photograph a calcified part, an abnormal soft tissue or the like of a small X-ray absorption difference with high resolution and high contrast.

However, under the above-mentioned photography conditions, in association with a dynamic range of measurement of the X-ray image tube being insufficient, there is a problem that even a slight deviation from the photography conditions makes it impossible to obtain an image of a proper density.

On the other hand, if objects of measurement are different in elemental composition, e.g., a bone and a muscle, it is necessary to set irradiation time of the X-rays by considering energy of the used X-rays, a thickness of the part, etc., and based on many experiences or the like. In this case, even if elemental compositions are substantially similar but densities are different, e.g., a normal tissue and an abnormal tissue such as a cancer, it is similarly necessary to set the irradiation time of the X-rays.

It is to be noted that color X-ray photographs changed in color corresponding to a difference in doses of an X-ray in color radiography are described in, for example, Jpn. Pat. Appln. KOKOKU Publication No. 48-6157 and Jpn. Pat. Appln. KOKOKU Publication. No. 48-12676. In the color X-ray photographs described in Jpn. Pat. Appln. KOKOKU Publication No. 48-6157 and Jpn. Pat. Appln. KOKOKU Publication No. 48-12676, a part of a small dose of the X-rays is colored by only a red component, a part of a lager dose of the X-rays is colored by adding a green component to the red component, and further a part of a large dose of the X-rays is colored by adding a blue component to the red component and the green component. Thus, coloring is carried out based on a difference in the doses of the X-rays.

However, even if information is extracted only from such a color change in the color X-ray photograph, for example, the green component and the blue component are added to the red component in the part of the large dose, and a color becomes similar to white in the color X-ray photograph. Consequently, accurate information extraction is difficult and, even if much information has been picked up, there is a problem that the information cannot be effectively used.

As a proposal considered effective for the above-mentioned problem, a color X-ray photograph capable of representing a plurality of colors corresponding to a dose of the X-rays is described in, for example, Jpn. Pat. Appln. KOKAI Publication No. 2001-209142. This publication discloses an emission sheet which emits a different color in accordance with a dose of a radiation such as the X-rays passed through a subject.

Additionally, in the above-mentioned publication, it is described that each of a plurality of colors emitted from the color emission sheet are detected by photodetecting means such as a color film or a color camera, and image information of a plurality of colors which have different sensitivity characteristics is obtained.

For the color emission sheet disclosed in the above-mentioned publication, there is used, for example, a fluorescent substance which comprises a main emission component corresponding to one luminescent color in a visible light range and at least one sub-emission component which has a luminescent color different from that of the main emission component and in which an emission ratio to the radiation of the same intensity is different from that of the main emission component. Moreover, in the above fluorescent substance to be used, an emission ratio between the main emission component and the sub-emission component is adjusted in accordance with a dynamic range of a photographic system.

Figure 11:
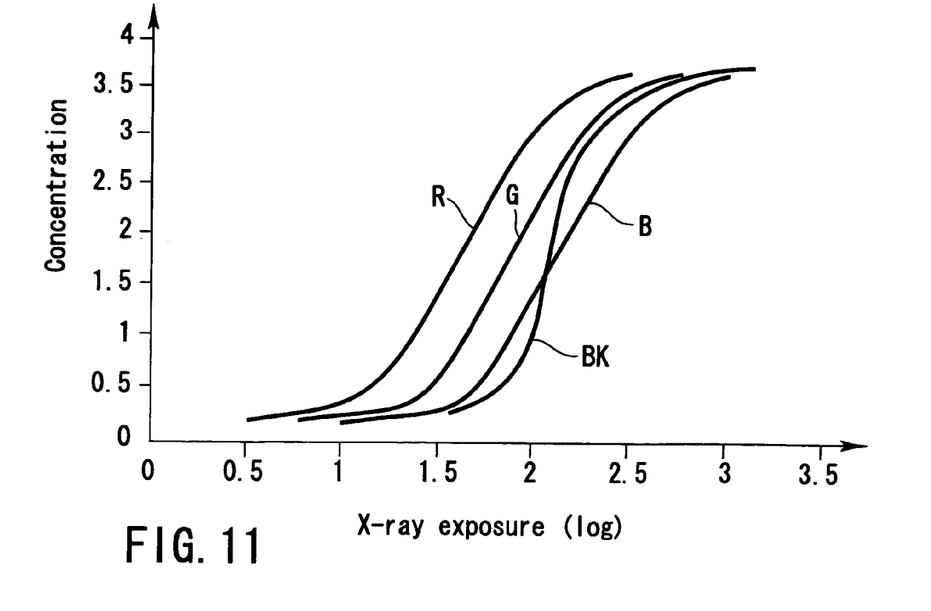
FIG. 11 is a graph showing characteristics of a color X-ray photograph, a dose of X-rays with which the illuminant layer used in the color X-ray image tube of the present invention is irradiated, and an emission luminance of each color component.

Additionally, in the color X-ray photograph of the above-mentioned publication, relationships between an exposure and a concentration of the X-ray of the photographic system are set to be approximately equal intervals among colors (R, G and B) of a multicolor illuminant similar to that shown in FIG. 11. In an image obtained by using this illuminant, a part of a low dose is obtained as information of a red color of a state in which there is no information of a green color or a blue color. When the dose becomes large, the red color information is saturated to be obtained as green color information. When the dose becomes larger, the red color information and the green color information are saturated to become blue color information. That is, an image of a proper density is formed under relatively wide conditions for the dose of the X-ray, and a great deal of information can be obtained from the obtained image based on a difference on the doses of the X-ray. It is known that in emission characteristics of the multicolor illuminant shown in FIG. 11, inclination of a characteristic curve of the exposure to the concentration is gentle compared with emission characteristics of a general illuminant for monochrome image pickup.

However, in the color X-ray photograph disclosed in the above-mentioned publication, a dynamic range of output image is increased by expanding the dynamic range of the photographic system. Thus, there is a problem that proper image pickup conditions cannot always be obtained depending on a photography target part of a human body or an animal which is a subject, or an individual difference.

For example, there is a problem that even under proper conditions in breast photography of small X-ray absorption or the like, an image of a proper density cannot be obtained in trunk bone photography of large X-ray absorption or the like unless a dynamic range is matched. There is also a danger that the subject will be subjected to excessive X-ray exposure even if a dynamic range is in a suitable range.

There is a problem that in a photographic system range, even in a state in which each information of a red color (R), a green color (G) and a blue color (B) can be picked up as a proper image for a part of a small X-ray absorption difference such as that between a normal tissue and an abnormal tissue of a cancer or the like, for example, even if a proper image can be obtained by information of one of a red color, a green color and a blue color for a part of large X-ray absorption, e.g., a part of a large X-ray absorption difference for diagnosis from a bone to a blood vessel, the part of the small X-ray absorption difference cannot be obtained as a proper image.

Such a problem is not limited to the X-ray photography for medical diagnosis, but it similarly occurs in the X-ray photography for industrial nondestructive inspection. For example, between a case in which an object of measurement is iron and a case in which an object of measurement is plastic, optimal photography conditions caused by a difference in density are different, and a thickness or the like of a part to be photographed must be taken into consideration. Additionally, if a plurality of different materials such as composite materials are present, there is a problem that it is difficult to obtain a proper image.

On the other hand, a dynamic range of measurement in the color X-ray photograph is widened to enable acquisition of a great deal of information by one photography. However, when a combination of a scintillator responsive to the X-rays and a color CCD camera is compared with a combination of an X-ray image tube and a monochrome CCD camera, the sensitivity of the X-ray image tube which includes electronic amplification is ten times higher or more.

This means that in the color X-ray photograph obtained by the X-ray scintillator (illuminant layer) and the color CCD camera, a dose of the X-rays must be increased in order to obtain an image similar to that in the case of the combination of the X-ray image tube and the monochrome CCD camera. Thus, in the constitution described in Jpn. Pat. Appln. KOKAI Publication No. 2001-209142, there is a problem that the dose of the X-rays with which the subject must be irradiated is increased.

As described above, in the color X-ray photograph, the dynamic range of the photographic system is wide, proper photography conditions can be set in accordance with subjects of different X-ray transmission doses, occurrence of an exposure shortage, excessive exposure or the like caused even by slight deviation from the photography conditions or the like is reduced, and subject measurement can be assured more.

However, in order to make a density of an image proper, if a subject is clear, there is a problem that an emission characteristic curve of each color must be adjusted by changing an emission ratio of the color illuminant layer (scintillator layer) to match the subject. Additionally, in the color X-ray photograph, sensitivity lowers to one tenth or less compared with the monochrome X-ray image tube.

Further, in order to detect an image, it is necessary to use a lens of high transmittance or a camera of high sensitivity. It is to be noted that even if the lens of high transmittance or the camera of high sensitivity can be used, there is a problem that sufficient sensitivity cannot always be obtained.

Furthermore, for industrial use, there is a problem that it is difficult to identify a material of a large atomic number. Aside from this, for medical use, as the dose of the X-rays with which a subject should be irradiated, a dose of X-rays 10 which is larger by 10 to 1000 times compared with the monochrome X-ray image tube may be required. If the subject is a human body, there is a high possibility of nonusability.

In any case, in the color X-ray photograph, acquisition of static images has been realized, whereas acquisition of moving images has not been realized yet.

BRIEF SUMMARY OF THE INVENTION

Objects of the present invention made with the foregoing problems in mind are to provide an X-ray image tube which enables acquisition of an image of a proper density by increasing contrast without increasing an irradiation dose of X-rays, an X-ray image tube device and an X-ray device. This invention has been developed to solve the foregoing problems, and it is directed to an X-ray image tube comprising a vacuum envelope, an input window which is formed at one end of the vacuum envelope and through which X-rays are input, and an output fluorescent screen which is disposed at the other end of the vacuum envelope so as to be opposite to the input window and which emits a different color in accordance with intensity of the input X-rays. In consequence, the X-rays are input through the input window of the vacuum envelope, and a different color is emitted from an output fluorescent screen in accordance with the intensity of the input X-rays. Additionally, the different color is emitted from the output fluorescent screen in accordance with the intensity of the X-rays input through the input window of the vacuum envelope. Therefore, an image of a proper density is obtained by increasing contrast without increasing an irradiation dose of the X-rays.

This invention is further directed to an X-ray device comprising an X-ray image tube including an X-ray source which irradiates a subject with X-rays, an input window which is formed at one end of a vacuum envelope irradiated with the X-rays passed through the subject and through which the X-rays are input, and an output fluorescent screen which is disposed at the other end of the vacuum envelope so as to be opposite to the input window and which emits a different color in accordance with an intensity of the input X-rays; and pickup means for picking up the different color emitted from the output fluorescent screen of the X-ray image tube in accordance with the intensity of the X-rays.

This invention is additionally directed to an X-ray image tube in which a multicolor illuminant is disposed on an output side to obtain a light of a different color in accordance with an intensity corresponding to an intensity of input X-rays by collision with an electron beam obtained by converting, into electrons, light obtained by X-ray-light conversion in a vacuum container of the X-rays which are input through an input window positioned at one end of the vacuum container, wherein the multicolor illuminant is disposed at a position which enables the collision with the electron beam amplified in the vacuum container, and capable of emitting light of at least two colors corresponding to the intensity of the amplified electron beam, a requirement for classifying the respective colors is a transmission dose of X-rays or an absorption dose of X-rays, and a range thereof is about 1000 times; and an X-ray device having the X-ray image tube.

Thus, according to the X-ray image tube of the present invention, for example, even if contrast of a radiation image is increased, an image of a proper density can be obtained in accordance with the subject, and the dynamic range of the radiation photographic system can be expanded.

Furthermore, according to the X-ray image tube of the present invention, by optimizing the range (dynamic range) of the exposure (dose of X-rays with which the subject is irradiated) of the photographic system and the multicolor illuminant (fluorescent screen) in accordance with the subject to combine them, it is possible to surely obtain a great deal of information by one photography in accordance with the subject without any control of X-ray absorption (transmission) characteristics of the subject.

DETAILED DESCRIPTION OF THE INVENTION

Next, an embodiment of an X-ray device of the present invention will be described with reference to the accompanying drawings.

Figure 2:
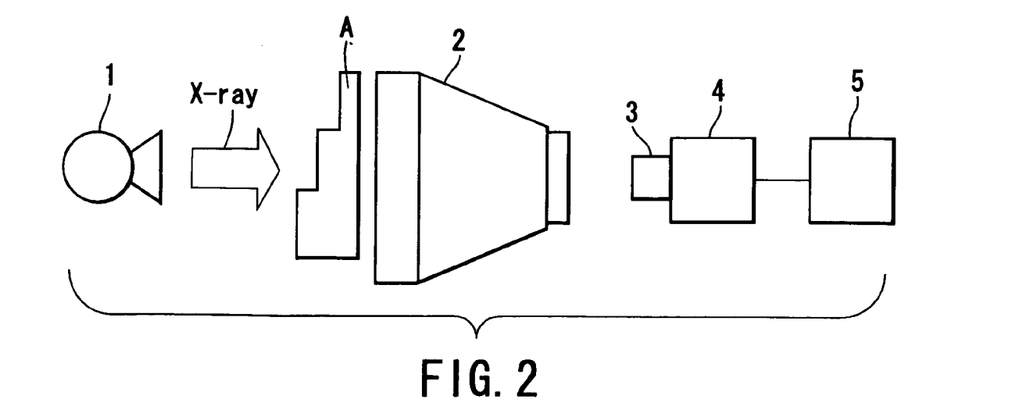
FIG. 2 is a conceptual view showing an X-ray device shown in FIG. 1.

As shown in FIG. 2, A is a subject such as a human body or one of various articles. This subject A is positioned between an X-ray tube 1 which is a radiation source as an X-ray source and an X-ray image tube 2 which outputs a color image. Radiation X from the X-ray tube 1 is absorbed or scattered through the subject A, and the X-ray image tube 2 is irradiated with the radiation X. The X-ray image tube 2 outputs a color image. Then, the color image of the X-ray image tube 2 is received through an optical system 3 by a color CCD camera 4 which is a planar semiconductor detector as pickup means, and displayed on a display monitor 5.

Now, the X-ray image tube 2 will be described by referring to FIG. 1.

Figure 1:
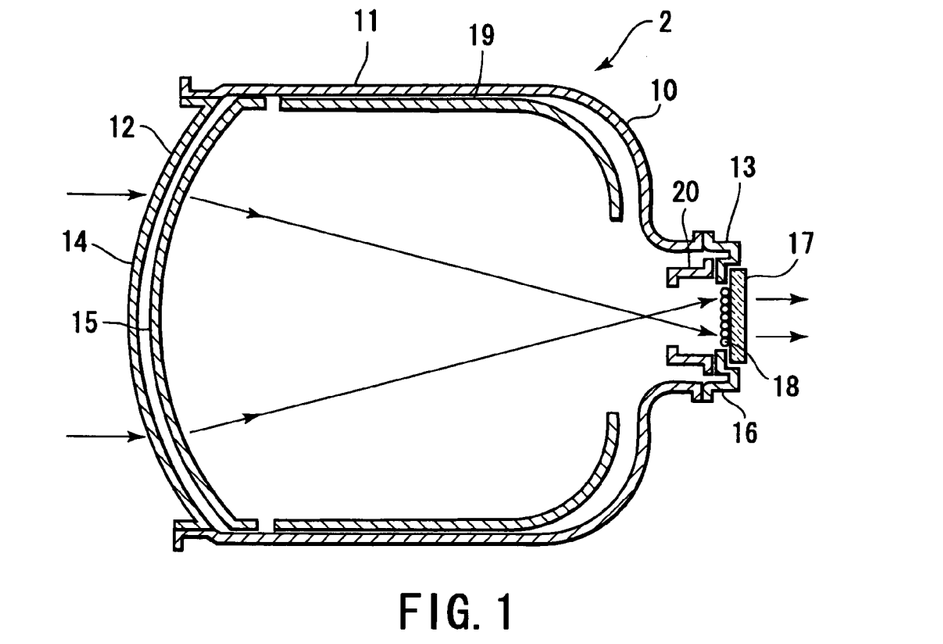
FIG. 1 is a sectional view showing a concept of an embodiment of an X-ray image tube of the present invention.

As shown in FIG. 1, the X-ray image tube 2 has a vacuum envelope 10 whose inside is vacuum, and this vacuum envelope 10 has a cylindrical tube main body 11. An input section 12 is formed on one end side of the tube main body 11, and on the other end side, an output section 13 is formed. In the input section 12, an input window 14 is formed on one end side of the tube main body 11, and an input fluorescent screen for accomplishing light emission with X-rays is formed on an inner surface side of the input window 14, and there is further disposed an input surface 15 for forming a photoelectric surface which is a charge conversion element for converting the light into electrons. Additionally, in the output section 13, a support 16 is attached to the other end side of the tube main body 11, a flat-plate or curved glass plate 17 is attached as an output window to the support 16, and a fluorescent substance 18 is disposed on an inner surface side of the glass plate 17 to form an output fluorescent screen.

Further, between the input section 12 and the output section 13 in the tube main body 11, there are arranged a focusing electrode 19 which functions as an electronic amplifier for accelerating, focusing and amplifying electrons, and an anode 20.

In the X-ray image tube 2, when the X-rays absorbed or scattered through the subject A or the like is made incident through the input window 14, light is emitted on the input surface 15, the emitted light is converted into electrons, the electrons are accelerated and focused by the focusing electrode 19, and guided toward the anode 20 to be amplified. The fluorescent substance 18 is excited by the electrons to emit light, the light being emitted in accordance with a luminance and a color based on a distribution of the incident X-rays, and an image is projected on the glass plate 17.

The fluorescent substance 18 contains a fluorescent substance which emits a plurality of colors, i.e., a fluorescent substance which has a plurality of emission wavelength ranges. Additionally, the fluorescent substance 18 which has sensitivity to, e.g., the color CCD camera 4, is used.

Here, according to the present invention, the input window and the input surface can be integrally formed, i.e., an output surface can be directly formed on an inner surface of the input window. The output window and the fluorescent substance can be separately formed, i.e., the fluorescent substance (layer) can be formed on a substrate different from that of the output window.

It is to be noted that as emitted light of the fluorescent substance 18, at least two of representative blue, green and red colors are used. In addition to these colors, various emitted colors such as purple and yellow may be used as long as they can be discriminated from one another. Additionally, the emitted red color may be orange.

The fluorescent substance 18 preferably has an emission spectrum which contains a main emission component corresponding to one emitted color in a visible light range, and at least one sub-emission component which has an emitted color different from that of the main emission component and in which an emission ratio with respect to a radiation of the same intensity, i.e., luminance, is smaller than that of the main emission component. The luminance of the sub-emission component is preferably in a range of 0.1 to 90% of that of the main emission component. That is, if the ratio of the sub-emission component exceeds 90% of the main emission component, a sufficiently accurate image is obtained for a part to be photographed in which a radiation absorption difference is small, but an expansion effect of the dynamic range of the photographic system which is an original feature is lost. On the other hand, if the ratio of the sub-emission component is less than 0.1% of the main emission component, it is an impossible range when a radiation absorption difference of an actual object to be photographed is taken into consideration.

For the fluorescent substance 18 which has the above-mentioned emission spectrum, for example, a rare earth fluorescent substance such as a fluorescent substance of gadolinium sulfate activated with europium ($Gd_2O_2S:Eu$) or a fluorescent substance of gadolinium sulfate activated with terbium ($Gd_2O_2S:Tb$) which has emission peaks in a plurality of emission wavelength ranges corresponding to emitted colors, a fluorescent substance of calcium tungstate ($CaWO_4$) which has a wide emission peak over a plurality of emission wavelength ranges, or the like can be used.

Figure 3:
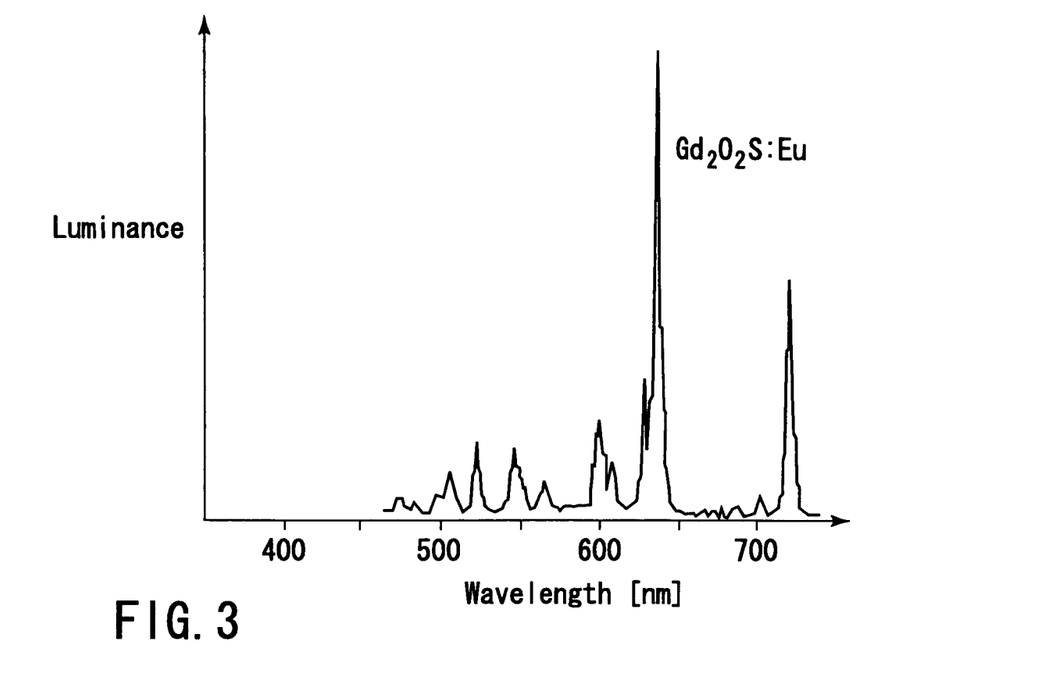
FIG. 3 is a graph showing emission characteristics of a red illuminant layer of the X-ray image tube shown in FIG. 1.

FIG. 3 shows an emission spectrum of the fluorescent substance 18 of gadolinium sulfate activated with europium ($Gd_2O_2S:Eu$), in which there is a main emission component in a red wavelength range of about 600 to 720 nm and there is a sub-emission component in a green wavelength range of about 500 to 600 nm. It is to be noted that the fluorescent substance 18 of gadolinium sulfate activated with europium ($Gd_2O_2S:Eu$) or the fluorescent substance 18 of yttrium sulfate activated with europium ($Y_2O_2S:Eu$) can be set to a proper emission ratio because an emission ratio of each component can be adjusted based on the activation amount of europium (Eu).

In such a fluorescent substance, the fluorescent substance 18 of gadolinium sulfate activated with europium ($Gd_2O_2S:Eu$) or the fluorescent substance 18 of yttrium sulfate activated with europium ($Y_2O_2S:Eu$), in order to accurately obtain a photographic image of the subject, an europium (Eu) concentration is preferably set in a range of 0.01 to 20 (mol %).

Figure 4:
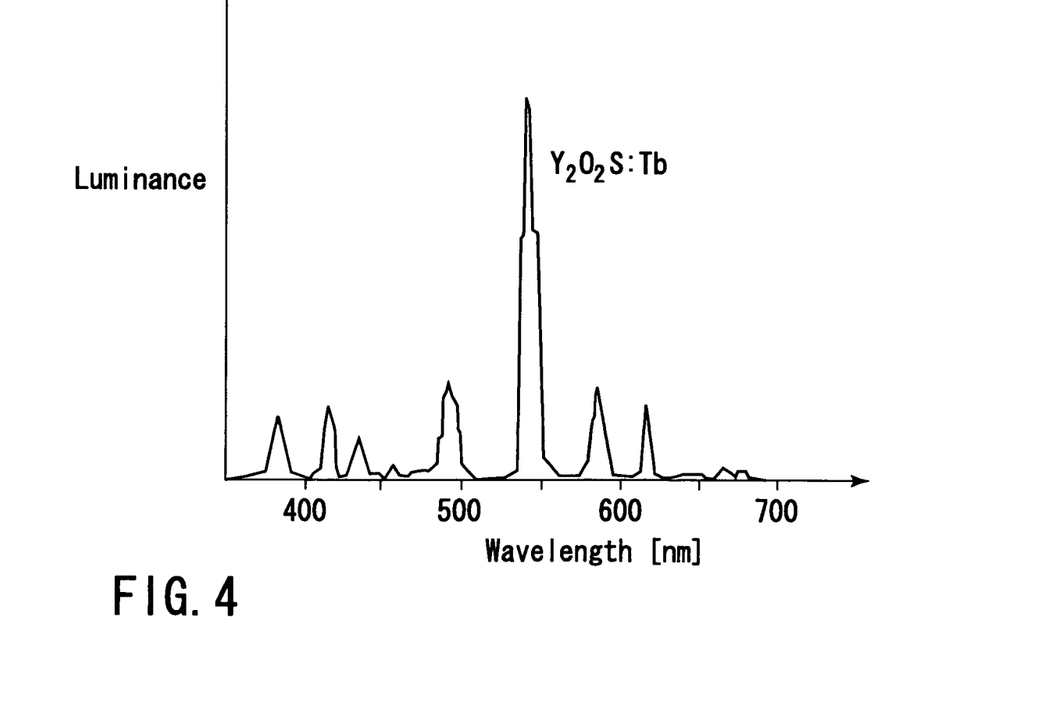
FIG. 4 is a graph showing emission characteristics of a green illuminant layer of the X-ray image tube shown in FIG. 1.

FIG. 4 shows an emission spectrum of the fluorescent substance 18 of yttrium sulfate activated with terbium ($Y_2O_2S:Tb$), in which there is a main emission component in a green wavelength range of about 500 to 600 nm and there is a sub-emission component in a blue wavelength range of about 400 to 500 nm.

For the fluorescent substance 18 of gadolinium sulfate activated with terbium ($Gd_2O_2S:Tb$) or the fluorescent substance 18 of yttrium sulfate activated with terbium ($Y_2O_2S:Tb$), an emission ratio of each component can be adjusted based on the activation amount of terbium (Tb). In the fluorescent substance 18 of gadolinium sulfate activated with terbium ($Gd_2O_2S:Tb$) or the fluorescent substance 18 of yttrium sulfate activated with terbium ($Y_2O_2S:Tb$), in order to suitably image an image of the subject, a terbium (Tb) concentration is preferably set in a range of 0.01 to 2 (mol %).

Figure 5:
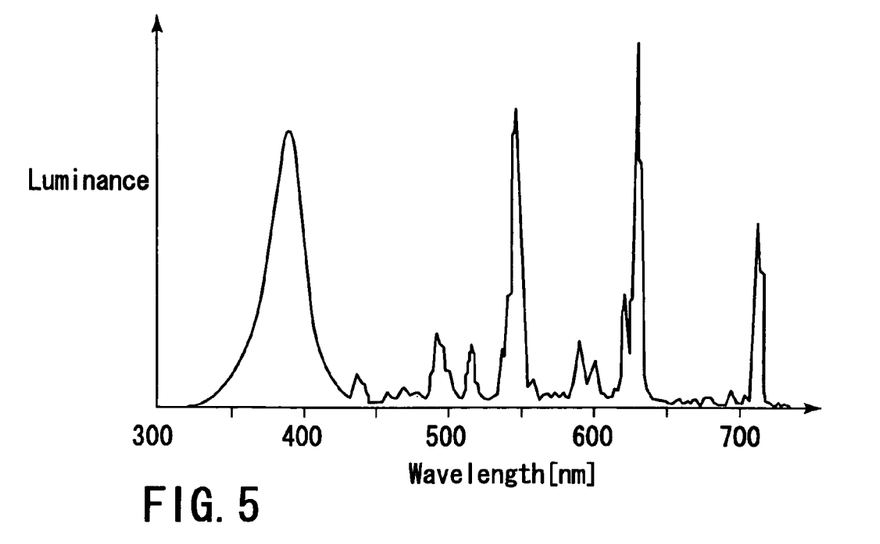
FIG. 5 is a graph showing emission characteristics of a multicolor illuminant layer which can be applied to the X-ray image tube shown in FIG. 1.

FIG. 5 shows an emission spectrum of a mixed fluorescent substance in which a red emission fluorescent substance of, e.g., gadolinium sulfate activated with europium ($Gd_2O_2S:Eu$), yttrium sulfate activated with europium ($Y_2O_2S:Eu$) or the like, a green emission fluorescent substance of gadolinium sulfate activated with terbium ($Gd_2O_2S:Tb$), yttrium sulfate activated with terbium ($Y_2O_2S:Tb$) or the like, and a blue emission fluorescent substance of, e.g., calcium tungstate ($CaWO_4$), barium fluorine chloride activated with europium (BaFCl:Eu) or the like are mixed at a proper mixing ratio. By properly setting a mixing ratio of two or more kinds of fluorescent substances in which emission ranges are different, it is possible to adjust an emission ratio of the main emission component and the sub-emission component.

Thus, by setting the main emission component corresponding to emitted light to be a red component, e.g., gadolinium sulfate activated with europium ($Gd_2O_2S:Eu$), and the other main emission component to be a green component, e.g., gadolinium sulfate activated with terbium ($Gd_2O_2S:Tb$), fluorescent screens of an enhanced emission intensity are formed in both of a long wavelength range of the red component and a middle wavelength range of the green component, emission of the green component is enlarged by adding gadolinium sulfate activated with terbium ($Gd_2O_2S:Tb$) compared with, e.g., only gadolinium sulfate activated with europium ($Gd_2O_2S:Eu$), and bits of information in both wavelength ranges can be constituted as images with good balance.

Examples of the other fluorescent substances 18 in which the main emission component is present in a red wavelength range of about 600 nm to 700 nm, if necessary, 650 nm to 700 nm include gadolinium borate activated with europium ($GdBO_3:Eu$), gadolinium oxide activated with europium ($Gd_2O_3:Eu$), gadolinium sulfate activated with europium ($Gd_2O_2S:Eu$), gadolinium aluminate activated with europium ($Gd_3Al_5O_{12}:Eu$), gadolinium gallate activated with europium ($Gd_3Ga_5O_{12}:Eu$), gadolinium vanadate activated with europium ($GdVO_4:Eu$), gadolinium gallate activated with cerium ($Gd_3Ga_5O_{12}:Ce$), gadolinium gallate activated with chromium ($Gd_3Ga_5O_{12}:Cr$), yttrium sulfate activated with europium ($Y_2O_2S:Eu$), yttrium aluminate activated with europium ($Y_3Al_5O_{12}:Eu$), gadolinium aluminate activated with europium ($Gd_3Al_5O_{12}:Eu$), lanthanum oxide activated with europium ($La_2O_3:Eu$), lanthanum sulfate activated with europium ($La_2O_2S:Eu$), indium borate activated with europium (InBO$_3$:Eu), and (yttrium, indium) borate activated with europium ((Y,In)BO$_2$:Eu).

Examples of the fluorescent substance 18 in which the main emission component is present in a green wavelength range of about 500 nm to 600 nm include gadolinium oxide activated with terbium (Gd$_2$O$_3$:Tb), gadolinium sulfate activated with terbium (Gd$_2$O$_2$S:Tb), gadolinium sulfate activated with praseodymium (Gd$_2$O$_2$S:Pr), gadolinium gallate activated with terbium (Gd$_3$Ga$_5$O$_{12}$:Tb), yttrium sulfate activated with terbium (Y$_2$O$_2$S:Tb), gadolinium aluminate activated with terbium (Gd$_3$Al$_5$O$_{12}$:Tb), yttrium oxide activated with terbium (Y$_2$O$_3$:Tb), yttrium oxide activated with dysprosium (Y$_2$O$_2$S:Dy), lanthanum sulfate activated with terbium (La$_2$O$_2$S:Tb), zinc sulfide activated with copper (ZnS:Cu), zinc sulfide activated with gold (ZnS:Au), zinc silicate activated with manganese (Zn$_2$SiO$_4$:Mn), indium borate activated with terbium (InBO$_3$:Tb), and manganese gallate activated with manganese (MgGa$_2$O$_4$:Mn).

Further, examples the fluorescent substance 18 in which the main emission component is present in a blue wavelength range of about 400 nm to 500 nm include yttrium aluminate activated with cerium (YAlO$_3$:Ce), yttrium silicate activated with cerium (Y$_2$SiO$_5$:Ce), gadolinium silicate activated with cerium (Gd$_2$SiO$_5$:Ce), yttrium tantalate activated with niobium (YTaO$_4$:Nb), barium fluorine chloride activated with europium (BaFCl:Eu), zinc sulfide activated with silver (ZnS:Ag), calcium tungstate (CaWO$_4$), cadmium tungstate (CdWO$_4$), zinc tungstate (ZnWO$_4$), magnesium tungstate (MgWO$_4$), strontium chloride phosphate activated with europium (Sr$_5$(PO$_4$)$_3$Cl:Eu), and yttrium phosphate activated with chlorine (YPO$_4$:Cl).

Additionally, an X-ray dose of a multicolor illuminant in which, e.g., a fluorescent substance of gadolinium sulfate activated with europium (Gd$_2$O$_2$S:Eu) which can emit a red color as the main emission component is added to the green emission fluorescent substance and the blue emission fluorescent substance described above with reference to FIG. 5, and an emission luminance of each color component are as described above with reference to FIG. 11. However, intervals among red (R), green (G) and blue (B) are preferably equal.

In the X-ray image tube 2 shown in FIG. 1, in order to improve resolution, proper particles of the fluorescent substance 18 are 0.5 μm to 2 μm, preferably 0.7 μm to 1.5 μm, more preferably 0.9 μm to 1.2 μm. In order to cause continuous and nearly uniform electron beams to uniformly emit light, the particles are densely laminated (laminated on two layers or more) on an output surface. It is to be noted that for the fluorescent substance 18, particles in a predetermined range of particle diameters are selected to be used by, e.g., classification.

If the fluorescent substance 18 is constituted of a plurality of kinds of fluorescent substances, for example, since the fluorescent substances 18 are powders, there is a method of using the fluorescent substances in a mixed manner. First, if two fluorescent substances are used, a fluorescent substance 18 in which the main emission component is a red component and one of fluorescent substances 18 in which the main emission components are blue and green components are used. If three fluorescent substances are used, the fluorescent substance 18 in which the main emission component is a red component, the fluorescent substance 18 in which the main emission component is a green component, and the fluorescent substance 18 in which the main emission component is a blue component are used. If four or more fluorescent substances are used, fluorescent substances 18 which are different from one another in wavelength ranges of the main emission components are used. By selecting materials and a ratio, emission ratios can be prepared by color.

As another method, there is an energy subtraction method for simultaneously obtaining images by X-ray energy which laminates different fluorescent substances 18. In this case, electron energy is changed in a first fluorescent substance near an incident side in accordance with an intensity of light, and the electron is amplified to form an image. This fluorescent screen is adjusted such that fluorescent substances of different emitted colors are laminated and coated to change a transmission dose in accordance with X-ray energy. If two, three, four or more fluorescent substances are used for the fluorescent substance 18, the same kinds as in the case of the mixing are used. However, regarding layers of the fluorescent substance 18, layers of longer wavelengths are arranged from the incident side, and arrayed in order of red, green and blue to vary emission ratios from color to color in accordance with the X-ray energy.

It is to be noted that in the X-ray image tube shown in FIG. 1, the color CCD camera 4 is used as the planar semiconductor detector. However, a C-MOS may be used.

Furthermore, according to the embodiment, the color CCD camera 4 is used through the optical system 3. However, the color CCD camera 4 may be directly attached to the glass plate 17 of the X-ray image tube 2. Thus, by directly attaching the color CCD camera 4, dispersion of light from an image projected on the glass plate 17 can be suppressed, and the optical system such as a lens can be reduced. Additionally, the X-ray image tube and its system can be miniaturized.

Figure 6:
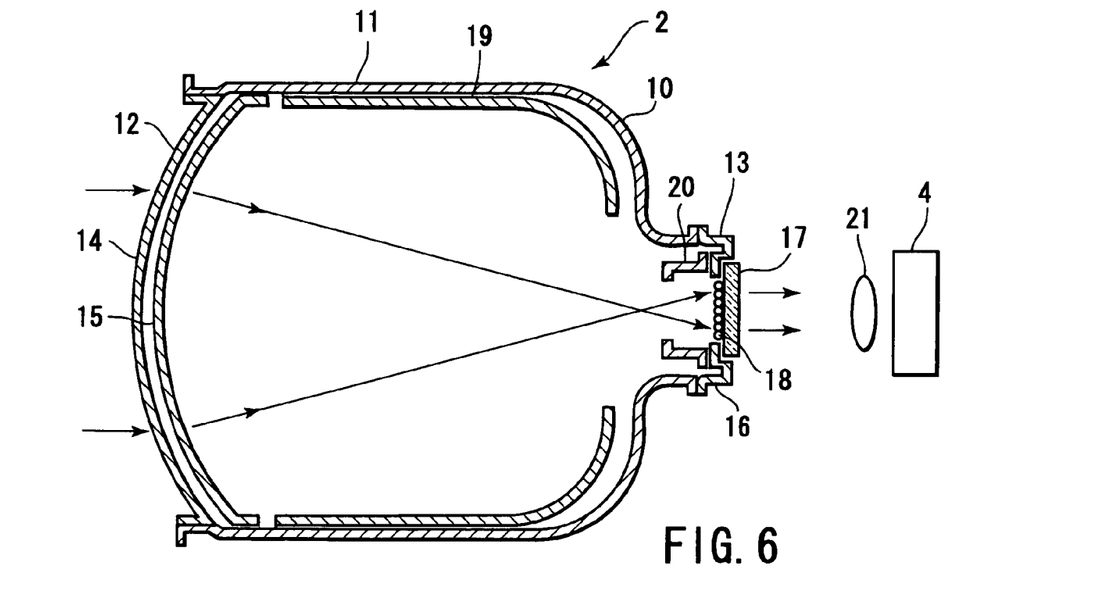
FIG. 6 is a sectional view showing a concept of an X-ray image tube of another embodiment of the X-ray image tube shown in FIG. 1.

FIG. 6 shows a concept of an X-ray image tube of another embodiment of the X-ray image tube shown in FIG. 1. As shown in FIG. 6, for example, a zooming mechanism 21 may be disposed between a glass plate 17 of an X-ray image tube 2 and a color CCD camera 4. Accordingly, by disposing the zooming mechanism 21, an image can be locally expanded, and resolution can be increased by optical zooming.

Figure 7:
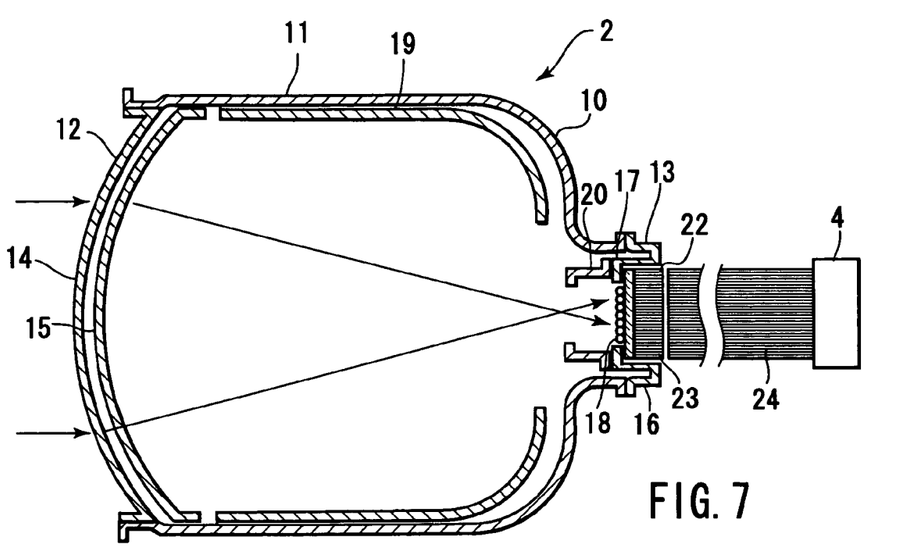
FIG. 7 is a sectional view showing a concept of an X-ray image tube of another embodiment of the X-ray image tube shown in FIG. 1.

FIG. 7 shows a concept of an X-ray image tube of another embodiment of the X-ray image tube shown in FIG. 1. As shown in FIG. 7, a mounting section 22 corresponding to a glass plate 17 is formed in a support 16, a fiber plate 23 corresponding to the glass plate 17 is attached to the mounting section 22, and an image fiber 24 is connected to the fiber plate 23 so as to be attached to the color CCD camera 4.

Thus, since the glass plate 17 which projects an image is directly connected to the color CCD camera 4 through the fiber plate 23 and the image fiber 24, transmission loss can be reduced, and diffusion of light from the image is prevented by the fiber plate 23 and the image fiber 24, whereby the image can be made clear.

It is to be noted that without disposing the glass plate 17 of FIG. 7, a fluorescent screen 18 can be directly formed on an end surface of the fiber plate 23. By this constitution, light can be directly taken out not through the glass plate 17, and loss of light can be reduced.

Additionally, the fiber plate 23 is set to a curvature in which an inner surface is curved, and matched with an image surface of an electronic lens, whereby a distortion-reduced image can be formed, which is more preferable.

Figure 8A:
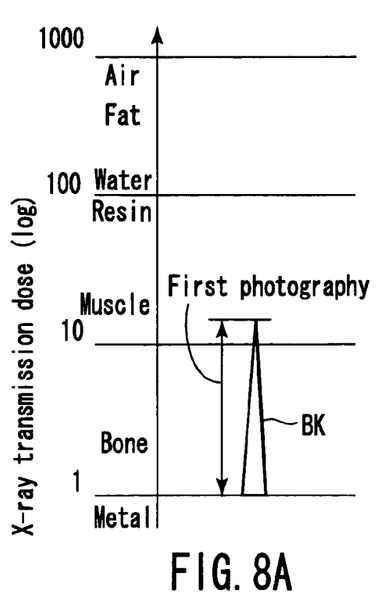
FIGS. 8A and 8B are schematic views explaining a relationship between a dose of X-rays with which an illuminant layer used in the X-ray image tube shown in each of FIGS. 1, 6 and 7 is irradiated, and emission characteristics of each color component and X-ray transmittance of an object of measurement.
Figure 8B:
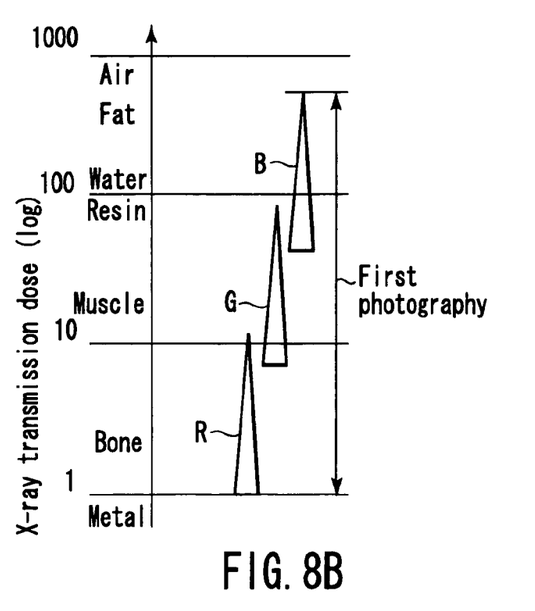

FIGS. 8A and 8B show a relationship between a dose of X-rays with which an illuminant layer used in the X-ray image tube shown in each of FIGS. 1, 6 and 7, and emission characteristics of each color component and X-ray transmittance of an object of measurement.

For example, if air, a fat, water, a resin, a muscle, a bone and a metal are considered as analytes, there is a difference of about ten times in transmission doses of X-rays between the bone and the muscle, a difference of about several tens times between the muscle and the fat, and a difference of several hundreds times between the bone and the fat. Thus, a composition and a dynamic range of the analyte to be photographed by one X-ray irradiation in a general X-ray image tube using a monochrome illuminant only are limited to a range of about ten times in terms of the transmission dose of the X-rays, shown in FIG. 8A. As described above, it must be avoided to irradiate the analyte with the X-rays plural times.

On the other hand, in an example shown in FIG. 8B which uses the color illuminant of the present invention, by one irradiation with X-rays, the analyte are simultaneously photographed by illuminants of R, G and B, i.e., from the bone to the muscle (from metal to not-shown metal of low density) as emission of the R fluorescent substance, from the muscle to the resin or the water (not-shown metal of low density) as emission of the G fluorescent substance, and from the resin or the water to the fat as emission of the B fluorescent substance. Thus, a dose of X-rays with which the subject is irradiated is sufficiently smaller compared with the case of plural times of irradiation.

It is to be noted that in each of FIGS. 8A and 8B, a portion shown to be thin indicates a state in which the X-rays passed through the subject to reach the fluorescent layer of each color is saturated.

Figure 9A:
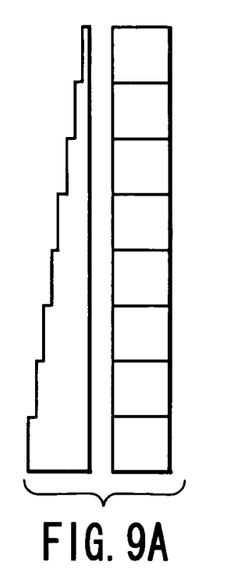
FIG. 9A is a schematic view explaining an example of a concentration scale used to evaluate an X-ray transmission dose and emission characteristics of the illuminant layer used in the X-ray image tube shown in each of FIGS. 1, 6 and 7.

FIG. 9A shows an example of a concentration scale used to evaluate a transmission dose of X-rays and emission characteristics of the illuminant layer used in the X-ray image tube shown in each of FIGS. 1, 6 and 7.

As shown in FIG. 9A, the concentration scale is for a metal, glass or the like in which a thickness is changed by an equal amount for each fixed distance (fixed reduction or fixed increase). Glass is used as a representative material of high X-ray transmittance, zirconium is used as an example of a low X-ray transmittance (large absorption of X-rays), and the number of gray scales is set to 8. Additionally, to explain the glass and the zirconium by referring to FIGS. 9B to 9D below, the glass is denoted by a code "G", and the zirconium is denoted by a code "Z".

Figure 9B:
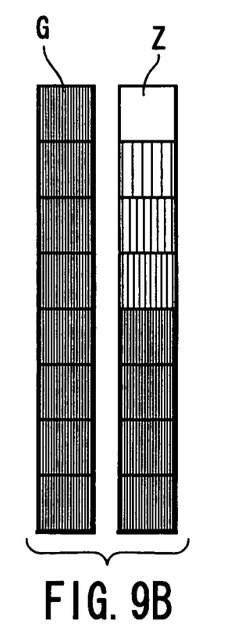
FIGS. 9B to 9D are schematic views showing examples of results of image pickup of the concentration scale shown in FIG. 9A based on the X-ray transmission dose of the illuminant layer used in the X-ray image tube shown in each of FIGS. 1, 6 and 7.
Figure 9C:
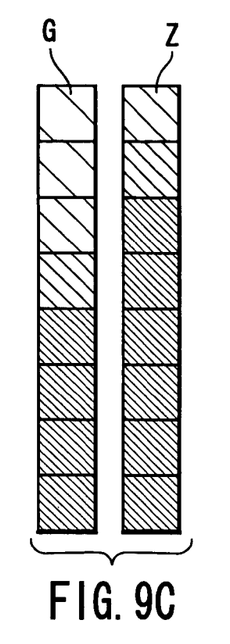
Figure 9D:
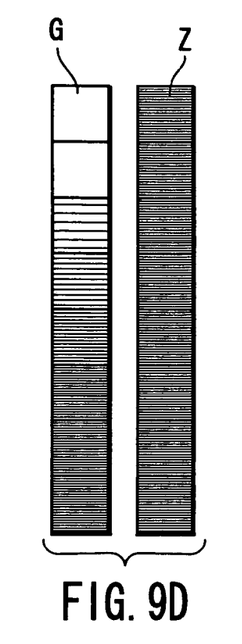

Each of FIGS. 9B to 9D is a schematic view showing an example of a result of image pickup of the concentration scale shown in FIG. 9A based on an X-ray transmission dose of the illuminant layer used in the X-ray image tube shown in each of FIGS. 1, 6 and 7. FIG. 9B shows a photography result by the R (red) illuminant, FIG. 9C shows a photography result by the G (green) illuminant, and FIG. 9D shows a photography result by the B (blue) illuminant.

As apparent from FIG. 9B, in the case of the glass G, no difference can be obtained by emission of the red illuminant because an X-ray transmission dose is large (saturated in almost all ranges). On the other hand, in the case of the zirconium Z, about four gray scales can be confirmed because an X-ray transmission dose is small compared with the glass.

As apparent from FIG. 9C, in the case of the emission of the green illuminant, about four gray scales can be confirmed even in the X-ray transmission dose of the glass G. On the other hand, in the case of the zirconium Z, only about two gray scales can be confirmed because the X-rays are absorbed compared with the glass.

As apparent from FIG. 9D, in the case of the emission of the blue illuminant, a shape is partially lost (cannot be photographed) because the X-ray transmission dose becomes large in the glass G. On the other hand, in the case of the zirconium Z, no concentration difference can be confirmed in all the ranges (all gray scales) because an X-ray absorption dose is saturated.

Figure 9E:
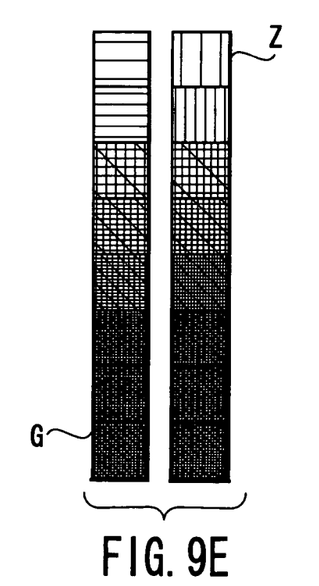
FIG. 9E is a schematic view showing an example of a result of image pickup of the concentration scale shown in FIG. 9A by multicolor based on the X-ray transmission dose of the illuminant layer used in the X-ray image tube shown in each of FIGS. 1, 6 and 7.

FIG. 9E shows an example of a result of multicolor image pickup of the concentration scale shown in FIG. 9A by a multicolor illuminant which uses the illuminants whose characteristics have been described with reference to FIGS. 9B, 9C and 9D. The multicolor illuminant shown in FIG. 9E which is used to obtain an image uses an illuminant in which color balance is improved by slightly changing the X-ray absorption doses in the illuminants used in FIGS. 9B to 9D. Thus, more gray scales are secured.

Figure 9F:
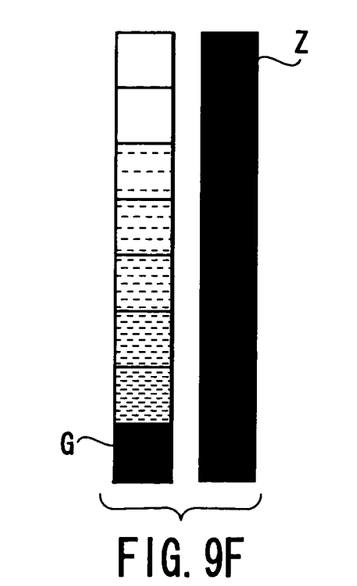
FIG. 9F is a schematic view showing an example of a result of image pickup of the concentration scale shown in FIG. 9A by monochrome by using a dose of X-rays equal to the X-ray transmission dose of the illuminant layer used in the X-ray image tube shown in each of FIGS. 1, 6 and 7, and by a well-known X-ray image tube of a monochrome type.

FIG. 9F is a schematic view showing an example of a result of monochrome image pickup of the concentration scale shown in FIG. 9A. It is recognized that contrast is clearly higher compared with the color image shown in FIG. 9E, the X-ray transmission dose is saturated in almost all the ranges in the case of the glass G, and the X-rays are completely absorbed in almost all the ranges in the case of zirconium Z.

Figure 9G:
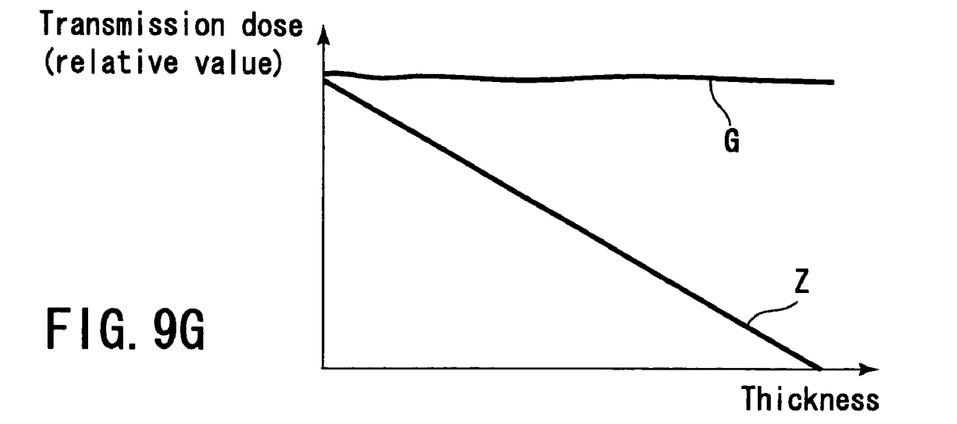
FIGS. 9G to 9I are graphs showing examples of image pickup of the concentration scale shown in FIG. 9A based on the X-ray transmission dose of the illuminant layer used in the X-ray image tube shown in each of FIGS. 1, 6 and 7 each as a relationship between a thickness of the concentration scale and a transmission dose.
Figure 9H:
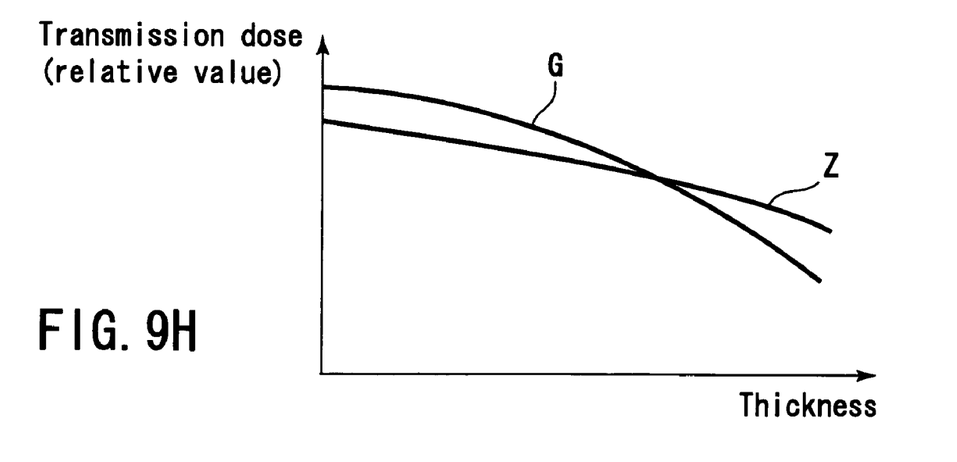
Figure 9I:
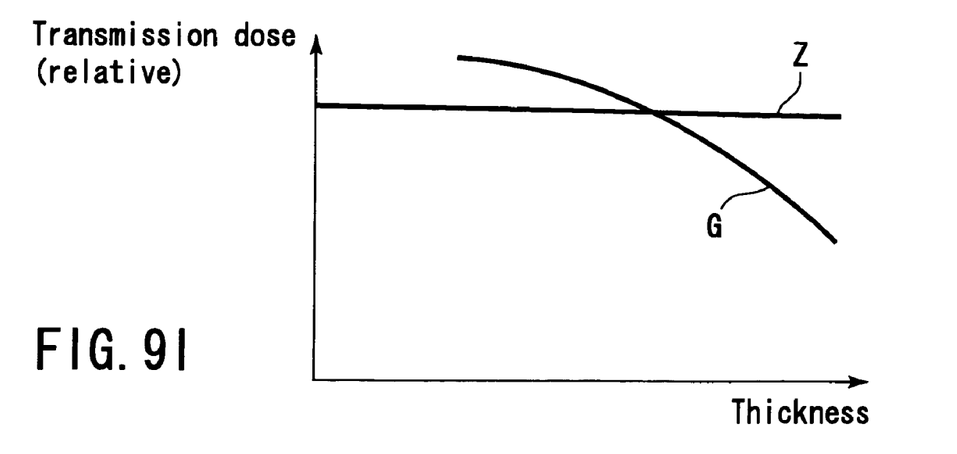

Each of FIGS. 9G to 9I shows an example of a result of image pickup of the concentration scale shown in FIG. 9A based on the X-ray transmission dose of the illuminant layer used in the X-ray image tube shown in each of FIGS. 1, 6 and 7 as a relationship between a thickness of the concentration scale and a transmission dose. FIG. 9G shows a level of emission by the red illuminant shown in FIG. 9B, FIG. 9H shows a level of emission by the green illuminant shown in FIG. 9C, and FIG. 9I shows a level of emission by the blue illuminant shown in FIG. 9D, which are all substituted for by the X-ray transmission doses.

According to FIGS. 9G to 9I, relationships between the X-ray transmission doses (absorption doses) shown in FIGS. 9B to 9E and an emission intensity of the illuminants of the colors are clearly explained.

Figure 10:
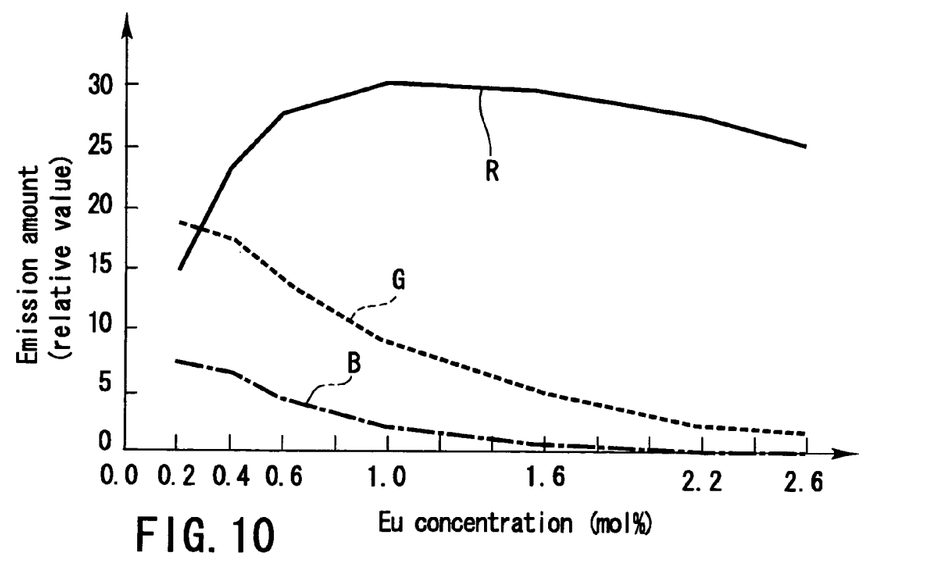
FIG. 10 is a graph explaining a relation between an emission intensity of each color of the multicolor illuminant shown in FIG. 5 and an concentration of europium (Eu) which is an activator.

FIG. 10 is a graph explaining a relationship between an emission intensity of each color of the multicolor illuminant (film thickness 1 μm) shown in FIG. 5 and a concentration of europium (Eu) which is an activator. Referring to FIG. 10, it can be understood that there is limited a change in an emission intensity of each of R, G and B in a range of 0.6 to 1.6 (mol %) around 1 (mol %) which is the above-mentioned preferable concentration of europium (Eu). It is recognized that light is emitted from each of the R, G and B illuminants in a range of 0.4 to 0.6 (mol %) or 1.6 to 2.2 (mol %) of the concentration. Additionally, it is recognized that intensity of light emitted from the red (R) and green (G) illuminants is reversed in a range of 0.2 to 0.4 (mol %) of the concentration. Further, it is recognized that emission intensity from an illuminant directed to a blue color (B) is greatly lowered in a range of 2.2 to 2.6 (mol %) of the concentration.

Thus, when the multicolor illuminant is prepared, a suitable range of a concentration of europium (Eu) used as an activator is preferably from 0.4 to 2.2 (mol %), more preferably from 0.6 to 1.6 (mol %).

As described above, according to the X-ray image tube of the present invention which uses the multicolor illuminant, by adjusting the ratio of the composition of the illuminant of the fluorescent substance, the main illuminant and the sub-illuminant in accordance with the subject, without greatly changing setting of photography conditions, a photographic image of a proper density and an accurate photographic image can be obtained by one photography without increasing the irradiation dose of X-rays. It is to be noted that even a perspective image and even a structure of a subject of different density are photographed widely as images.

According to the present invention, by using the above-mentioned X-ray image tube, it is possible to constitute an X-ray image tube device which comprises a lens, a color CCD camera etc., on at least an output surface side, and the X-ray image tube or the X-ray image tube device can be incorporated in an X-ray device to be used.

That is, for example, when a breast is photographed as a subject, a photographer selects an X-ray pickup device for the breast or equivalent to the breast from fluorescent substances in accordance with the subject to execute measurement, or depresses an operation button corresponding to the subject on, e.g., an operation panel to automatically set an X-ray device which has a fluorescent substance for the breast or equivalent to the breast from X-ray devices incorporated beforehand in roentgen devices. If first photography results in an image of an improper density, the density of the image is automatically detected to enable proper adjustment of a color emission level by software.

Additionally, emitted light of a plurality of colors is picked up by the color CCD camera, and the light can be displayed separately by colors with red (R), green (G) and blue (B) set as main components on the display monitor. Thus, compared with the conventional displaying of only the green component, an image displayed by other color components contains information necessary for wider diagnosis and inspection, and three colors are simultaneously displayed to enable displaying of a color image.

Alternatively, the emitted light can be individually detected after separation for each color (wavelength). Emitted light in which light of a plurality of colors are mixed is transmitted through a plurality of dichroic mirrors to be separated (spectroscopy) for each wavelength, and each separated light signal is picked up by the CCD camera. Specifically, for the emitted light in which the lights of a plurality of colors are mixed, only a red component is reflected by a first dichroic mirror while green and blue components are transmitted. Next, only the green component is reflected by a second dichroic mirror while the blue component is transmitted. In this case, since reflectance and transmittance of each color component can be individually set based on designing of a dielectric multi-player film which constitutes the dichroic mirror, sensitivity of each color can be controlled. Then, each separated light is picked up by the CCD camera.

On the other hand, when monochrome displaying is carried out on the display monitor, almost all bits of information represented in a color image can be contained by software (application) or a circuit. Thus, by an optional displaying method, compared with the conventional image obtained by a combination of an only green image with the monochrome CCD camera, it is possible to form an image higher in sensitivity and wider in dynamic range, and more excellent in identification performance and diagnosis performance.

Therefore, in various kinds of radiation photographies inclusive of radiation photography for medical diagnosis, occurrence of photography mistakes can be suppressed, inspection information can be increased, and improvement of inspection accuracy and the like can be expected.

Moreover, since red sensitivity of an emission wavelength 600 nm or higher, especially 650 nm or higher if necessary, can be set in the fluorescent substance, compared with the conventional green image, sensitivity is improved in association with the combination with the color camera.

Thus, a dose of a necessary input X-rays can be reduced to a required dose in the same subject, whereby X-ray exposure of the subject or the operator can be effectively reduced. Additionally, even if contrast of an X-ray image is increased, an image of a proper density can be obtained in accordance with the subject, and a great deal of information can be surely and effectively obtained by one photography in accordance with the subject. Furthermore, for example, since an identification image corresponding to a chest and a bone structure, a thickness of a bone can be projected, necessary information can be obtained by a small number of images, and high-level diagnosis or inspection can be achieved or the amount of photography can be reduced.

According to the present invention, the X-rays are input through the input window of the vacuum envelope, is the different color is emitted through the output window in accordance with the intensity of the input X-rays and, since the different color is emitted through the output window of the vacuum envelope in accordance with the intensity of the input X-rays, without increasing the irradiation dose of X-rays, it is possible to obtain an image of a proper density by increasing contrast.

What is claimed is:

1. An X-ray image tube comprising:
    a vacuum envelope,
    an input window which is formed at one end of the vacuum envelope and through which X-rays are input, and
    an output fluorescent screen which is disposed at the other end of the vacuum envelope so as to be opposite to the input window, which emits a different color in accordance with intensity of the input X-rays, and which has a light emission peak in each wavelength region.

2. An X-ray image tube according to claim 1, wherein the output fluorescent screen mainly emits a luminous color of a red component.

3. An X-ray image tube according to claim 1, wherein the output fluorescent screen comprises at least two kinds of fluorescent substance in which a main emission component is a red component and fluorescent substance in which a main emission component is one of a blue component and a green component.

4. An X-ray image tube according to claim 3, wherein the fluorescent substance in which the main emission component is the red component, and the fluorescent substance in which the main emission component is one of the blue component and the green component are laminated together.

5. An X-ray image tube according to claim 3, wherein the fluorescent substance in which the main emission component is the red component, and the fluorescent substance in which the main emission component is one of the blue component and the green component is in the state of a mixture.

6. An X-ray image tube according to any one of claims 2 to 5, wherein the fluorescent substance in which the main emission component is the red component contains at least one selected from the group consisting of gadolinium borate activated with europium ($GdBO_3$:Eu), gadolinium oxide activated with europium ($Gd_2O_3$:Eu), gadolinium sulfate activated with europium ($Gd_2O_2S$:Eu), gadolinium aluminate activated with europium ($Gd_3Al_5O_{12}$:Eu), gadolinium gallate activated with europium ($Gd_3Ga_5O_{12}$:Eu), gadolinium vanadate activated with europium ($GdVO_4$:Eu), gadolinium gallate activated with cerium ($Gd_3Ga_5O_{12}$:Ce), gadolinium gallate activated with chromium ($Gd_3Ga_5O_{12}$:Cr), yttrium sulfate activated with europium ($Y_2O_2S$:Eu), yttrium aluminate activated with europium ($Y_3Al_5O_{12}$:Eu), gadolinium aluminate activated with europium ($Gd_3Al_5O_{12}$:Eu), lanthanum oxide activated with europium ($La_2O_3$:Eu), lanthanum sulfate activated with europium (La2O2S:Eu), indium borate activated with europium (InBO3:Eu), and (yttrium, indium) borate activated with europium ((Y,In)BO2:Eu).

7. An X-ray image tube according to any one of claims 2 to 5, wherein the fluorescent screen in which the main emission component is the green component contains at least one selected from the group consisting of gadolinium oxide activated with terbium (Gd2O3:Tb), gadolinium sulfate activated with terbium (Gd2O2S:Tb), gadolinium sulfate activated with praseodymium (Gd2O2S:Pr), gadolinium gallate activated with terbium (Gd3Ga5O12:Tb), yttrium sulfate activated with terbium (Y2O2S:Tb), gadolinium aluminate activated with terbium (Gd3Al5O12:Tb), yttrium oxide activated with terbium (Y2O3:Tb), yttrium oxide activated with dysprosium (Y2O2S:Dy), lanthanum sulfate activated with terbium (La2O2S:Tb), zinc sulfide activated with copper (ZnS:Cu), zinc sulfide activated with gold (ZnS:Au), zinc silicate activated with manganese (Zn2SiO4:Mn), indium borate activated with terbium (InBO3:Tb), and manganese gallate activated with manganese (MgGa2O4:Mn).

8. An X-ray image tube according to any one of claims 2 to 5, wherein the fluorescent screen in which the main emission component is the blue component contains at least one selected from the group consisting of yttrium aluminate activated with cerium (YAlO3:Ce), yttrium silicate activated with cerium (Y2SiO5:Ce), gadolinium silicate activated with cerium (Gd2SiO5:Ce), yttrium tantalate activated with niobium (YTaO4:Nb), barium fluorine chloride activated with europium (BaFCl:Eu), zinc sulfide activated with silver (ZnS:Ag), calcium tungstate (CaWO4), cadmium tungstate (CdWO4), zinc tungstate (ZnWO4), magnesium tungstate (MgWO4), strontium chloride phosphate activated with europium (Sr5(PO4)3Cl:Eu), and yttrium phosphate activated with chlorine (YPO4:Cl).

9. An X-ray image tube according to any one of claims 2 to 5, wherein a concentration of an activator for use in the fluorescent substance in which the main emission component is the red, green or blue component is preferably from 0.4 to 2.2 (mol %).

10. An X-ray image tube according to claim 9, wherein the concentration of the activator for use in the fluorescent substance in which the main emission component is the red, green or blue component is preferably from 0.6 to 1.6 (mol %).

11. An X-ray image tube according to any one of claim 10, wherein a diameter of the fluorescent substance in which the main emission component is the red, green or blue component is preferably from 0.7 μm to 1.5 μm.

12. An X-ray image tube according to claim 11, wherein the diameter of the fluorescent substance in which the main emission component is the red, green or blue component is preferably from 0.9 μm to 1.2 μm.

13. An X-ray image tube device having the X-ray image tube described in claim 1, comprising:
pickup means for picking up a different color in accordance with the intensity of X-rays emitted from an output fluorescent screen.

14. An X-ray image tube device according to claim 13, wherein the pickup means is a planar semiconductor detector.

15. An X-ray device comprising:
an X-ray source which irradiates a subject with X rays;
an X-ray image tube according to claim 1 which is irradiated with the X-rays passed through the subject; and
pickup means for picking up a different color in accordance with an intensity of X-rays emitted through an output window of the X-ray image tube.

16. An X-ray image tube in which a multicolor illuminant is disposed on an output side having a light emission peak in each wavelength region, the multicolor illuminant being disposed to obtain light of a different color in accordance with an intensity corresponding to an intensity of input X-rays by collision with an electron beam obtained by converting, into electrons, light obtained by X-ray-light conversion in a vacuum container of the X-rays which are input through an input window positioned at one end of the vacuum container,
wherein the multicolor illuminant is disposed at a position which enables the collision with the electron beam amplified in the vacuum container, and capable of emitting light of at least two colors corresponding to the intensity of the amplified electron beam, a requirement for classifying the respective colors is a transmission dose of X-rays or an absorption dose of X-rays, and a range thereof is about 1000 times, and
an X-ray device having the X-ray image tube.

17. An X-ray image apparatus comprising:
a vacuum envelope;
an input window which is formed at one end of the vacuum envelope and through which X-rays are input;
an output fluorescent screen which is disposed at the other end of the vacuum envelope so as to be opposite to the input window, the fluorescent screen being adapted to emit at least one first wavelength light in response to a first intensity of input X-rays, emit at least one second wavelength light in response to a second intensity of input X-rays, and emit at least one third wavelength light in response to a third intensity of input X-rays; and
a camera directed toward the output fluorescent screen and adapted to detect light in each of the first, second, and third wavelengths.

18. The X-ray image apparatus of claim 17, wherein the at least one first wavelength is in a first light region between 600 and 720 nm, the at least one second wavelength is in a second light region between 500 and 600 nm, and the at least one third wavelength is in a third light region between 400 and 500 nm.

19. The X-ray image apparatus of claim 18, wherein the first light region encompasses red light, wherein the second light region encompasses green light, wherein the third light region encompasses blue light, and wherein the camera is adapted to detect red, green, and blue light.

20. The X-ray image apparatus of claim 19, wherein the fluorescent screen is adapted to establish substantially uniform luminance in each of the first, second, and third light regions when the intensity of input X-rays corresponds to the largest of the first, second, and third intensities of input X-rays.

21. The X-ray image apparatus of claim 17, wherein the second intensity of input X-rays is at least 10 times more intense than the first intensity of input X-rays, and wherein the third intensity of input X-rays is at least 100 times more intense than the first intensity of input X-rays.

* * * * *